(12) United States Patent
Tani et al.

(10) Patent No.: US 12,430,340 B2
(45) Date of Patent: Sep. 30, 2025

(54) PROCESSING APPARATUS, PROCESSING METHOD, AND NON-TRANSITORY STORAGE MEDIUM

(71) Applicant: NEC Corporation, Tokyo (JP)

(72) Inventors: Masahiro Tani, Tokyo (JP); Keisuke Ikeda, Tokyo (JP); Kazufumi Kojima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 45 days.

(21) Appl. No.: 18/388,718

(22) Filed: Nov. 10, 2023

(65) Prior Publication Data

US 2024/0168960 A1    May 23, 2024

(30) Foreign Application Priority Data

Nov. 18, 2022    (JP) ................................. 2022-184680

(51) Int. Cl.
*G06F 16/00*        (2019.01)
*G06F 16/2457*      (2019.01)
(Continued)

(52) U.S. Cl.
CPC ...... *G06F 16/24573* (2019.01); *G06F 16/248* (2019.01); *G06F 16/25* (2019.01);
(Continued)

(58) Field of Classification Search
CPC ............. G06F 16/24573; G06F 16/248; G06F 16/958; G06F 16/955; G06F 16/951;
(Continued)

(56) References Cited

U.S. PATENT DOCUMENTS 9,996,846  B2 *   6/2018   Boss .................. G06Q 30/0201
11,348,125 B2 *   5/2022   Rao .................... G06F 16/90332
(Continued)

FOREIGN PATENT DOCUMENTS

JP    2013-122630 A    6/2013
JP    2014-016870 A    1/2014
(Continued)

OTHER PUBLICATIONS

Anuja Arora et al., "Measuring social media influencer index-insights from facebook, Twitter and Instagram", Journal of Retailing and Consumer Services vol. 49, Jul. 2019, pp. 86-101.*
(Continued)

*Primary Examiner* — Srirama Channavajjala
(74) *Attorney, Agent, or Firm* — Sughrue Mion, PLLC

(57) ABSTRACT

In order to extract, with high accuracy, useful information from contribution information of social media, the present invention provides a processing apparatus 10 including: an acquisition unit 11 that acquires contribution information relating to a target area; a computation unit 12 that computes a degree of reliability of the contribution information, based on at least two of an activity area of a contributor of the contribution information, a degree of reliability of an estimation result of the activity area, a degree of disclosure of a profile of the contributor, an attribute of the contributor, an attribute of the activity area for the contributor, and a category of a content of the contribution information; and an output unit 13 that outputs the contribution information in which a degree of reliability of the contribution information is higher than a threshold value.

17 Claims, 7 Drawing Sheets

(51) Int. Cl.
*G06F 16/248* (2019.01)
*G06F 16/25* (2019.01)
*G06F 16/29* (2019.01)
*G06F 16/951* (2019.01)
*G06F 16/9535* (2019.01)
*G06F 16/9537* (2019.01)
*G06F 16/955* (2019.01)
*G06F 16/958* (2019.01)
*G06Q 50/00* (2012.01)

(52) U.S. Cl.
CPC ............ *G06F 16/29* (2019.01); *G06F 16/951* (2019.01); *G06F 16/9535* (2019.01); *G06F 16/9537* (2019.01); *G06F 16/955* (2019.01); *G06F 16/958* (2019.01); *G06Q 50/01* (2013.01)

(58) Field of Classification Search
CPC ... G06F 16/9535; G06F 16/9537–9538; G06F 16/29; G06F 16/25; G06Q 50/01; G06Q 30/0205; G06Q 30/0269; G06Q 30/0255–0256; G06Q 30/0251; G06Q 30/0201
See application file for complete search history.

(56) References Cited

U.S. PATENT DOCUMENTS

| | | | | |
|---|---|---|---|---|
| 12,020,265 | B1* | 6/2024 | Mao | G06Q 30/0243 |
| 2012/0233191 | A1* | 9/2012 | Ramanujam | G06F 16/9536 |
| | | | | 707/E17.107 |
| 2014/0304254 | A1* | 10/2014 | Rubinstein | G06F 16/24578 |
| | | | | 707/758 |
| 2017/0177201 | A1* | 6/2017 | Disdero | G06F 16/26 |
| 2017/0262451 | A1* | 9/2017 | Milner | G06F 16/285 |
| 2018/0314699 | A1* | 11/2018 | Guo | G06Q 10/101 |
| 2019/0012746 | A1* | 1/2019 | Sullivan | G06Q 30/02 |
| 2019/0095174 | A1* | 3/2019 | Trudel | G06F 16/23 |
| 2020/0234316 | A1* | 7/2020 | Jouhikainen | G06Q 30/0201 |
| 2021/0209118 | A1* | 7/2021 | Reuther | G06F 16/242 |
| 2022/0239620 | A1* | 7/2022 | Ikeda | H04L 51/04 |

FOREIGN PATENT DOCUMENTS

| | | |
|---|---|---|
| JP | 2022-114389 A | 8/2022 |
| WO | WO 2014169672 A1 * | 10/2014 |
| WO | 2016/051810 A1 | 4/2016 |
| WO | 2019/187107 A1 | 10/2019 |
| WO | 2019/234827 A1 | 12/2019 |
| WO | 2021/028988 A1 | 2/2021 |
| WO | 2022/074807 A1 | 4/2022 |
| WO | WO 2022213028 A1 * | 10/2022 |

OTHER PUBLICATIONS

Sinjana Yerasani et al., "Estimation and maximization of user influence in social networks", International Journal of Information Management vol. 47, Aug. 2019, pp. 44-51.*

Sami Al-Yazidi et al., "Measuring Reputation and Influence in Online Social Networks: A Systematic Literature Review", IEEE Access (vol. 8, 2020, p. 105824-105851).*

Keisuke Ikeda, Kazufumi Kojima, and Masahiro Tani, "A Study of a Resident Area Estimation Method in which Attention is Focused on Geographic Proximity of Friends", The Institute of Electronics, Information and Communication Engineers, IEICE Technical Report, vol. 119, No. 317, pp. 37 to 42, AI2019-36, Nov. 2019.

Dan Xu, Peng Cui, Wenwu Zhu, and Shiqiang Yang, "Graph-based residence location inference for social media users", IEEE Computer Society, IEEE MultiMedia, vol. 21, Issue 4, pp. 76 to 83, Oct. 2014.

Backstrom Lars, Eric Sun, and Cameron Marlow, "Find me if you can: Improving geographical prediction with social and spatial proximity" Proceedings of the 19th international conference on World Wide Web, 2010, pp. 61 to 70.

Liu Zhi and Yan Huang, "Closeness and structure of friends help to estimate user locations", International Conference on Database Systems for Advanced Applications, Springer, pp. 33 to 48.

Keisuke Ikeda, Kazufumi Kojima, and Masahiro Tani, "Social media user's location estimation method based on Kernel Density Estimation", The Institute of Electronics, Information and Communication Engineers, IEICE Technical Report, vol. 120, No. 379, pp. 18 to 23, AI2020-41, Feb. 2021.

Y. Li, Y. Peng, W. Ji, Z. Zhang, and Q. Xu, "User Identification Based on Display Names Across Online Social Networks", IEEE Access, vol. 5, pp. 17342 to 17353, Aug. 25, 2017.

X. Han, X. Liang, and et al. "Linking social network accounts by modeling user spatiotemporal habits", Intelligence and Security Informatics (ISI), IEEE International Conference on, 2017, pp. 19-24.

* cited by examiner

FIG. 5

TARGET AREA : KAWASAKI CITY, KANAGAWA PREFECTURE

| CONTRIBUTION INFORMATION ID | CONTRIBUTION INFORMATION | LOCATION INFORMATION | DEGREE OF RELIABILITY | · · · · |
|---|---|---|---|---|
| M0013132 | CURRY HERE IS DELICIOUS! | $(x_1, y_1)$ | 98 | · · · |
| · · · · | · · · · | · · · · | · · · · | · · · · |

PROCESSING APPARATUS, PROCESSING METHOD, AND NON-TRANSITORY STORAGE MEDIUM

This application is based upon and claims the benefit of priority from Japanese patent application No. 2022-184680, filed on Nov. 18, 2022, the disclosure of which is incorporated herein in its entirety by reference.

TECHNICAL FIELD

The present invention relates to a processing apparatus, a processing method, and a program.

BACKGROUND ART

A technique relating to the present invention is disclosed in Patent Document 1 (Japanese Patent Application Publication No. 2014-016870), Patent Document 2 (International Patent Publication No. WO2022/074807), Patent Document 3 (International Patent Publication No. WO2016/051810), Patent Document 4 (International Patent Publication No. WO2021/028988), Patent Document 5 (International Patent Publication No. WO2019/187107), Patent Document 6 (International Patent Publication No. WO2019/234827), Patent Document 7 (Japanese Patent Application Publication No. 2013-122630), Patent Document 8 (Japanese Patent Application Publication No. 2022-114389), Non-Patent Document 1 (Keisuke Ikeda, Kazufumi Kojima, and Masahiro Tani, "A Study of a Resident Area Estimation Method in which Attention is Focused on Geographic Proximity of Friends", The Institute of Electronics, Information and Communication Engineers, IEICE Technical Report, Vol. 119, No. 317, pp. 37 to 42, AI2019-36, November 2019), Non-Patent Document 2 (Dan Xu, Peng Cui, Wenwu Zhu, and Shiqiang Yang, "Graph-based residence location inference for social media users", IEEE Computer Society, IEEE MultiMedia, Volume 21, Issue 4, pp. 76 to 83, October 2014), Non-Patent Document 3 (Backstrom Lars, Eric Sun, and Cameron Marlow, "Find me if you can: Improving geographical prediction with social and spatial proximity" Proceedings of the 19th international conference on World Wide Web, 2010, pp. 61 to 70), Non-Patent Document 4 (Liu Zhi and Yan Huang, "Closeness and structure of friends help to estimate user locations", International Conference on Database Systems for Advanced Applications, Springer, pp. 33 to 48), Non-Patent Document 5 (Keisuke Ikeda, Kazufumi Kojima, and Masahiro Tani, "Social media user's location estimation method based on Kernel Density Estimation", The Institute of Electronics, Information and Communication Engineers, IEICE Technical Report, Vol. 120, No. 379, pp. 18 to 23, AI2020-42, February 2021), Non-Patent Document 6 (Y. Li, Y. Peng, W. Ji, Z. Zhang, and Q. Xu, "User Identification Based on Display Names Across Online Social Networks", IEEE Access, Vol. 5, pp. 17342 to 17353, Aug. 25, 2017), and Non-Patent Document 7 (X. Han, X Liang, and et al. "Linking social network accounts by modeling user spatiotemporal habits", Intelligence and Security Informatics (ISI), IEEE International Conference on, 2017).

Patent Document 1 discloses a technique for identifying, as information having credibility, information provided from a "person who well knows the area". Specifically, the technique evaluates credibility of information, based on a daily life sphere indicating an activity area of a user who provides community information.

Patent Document 2 discloses a technique for estimating, based on information of social media, an activity area of a user.

Patent Document 3 discloses a technique for collecting information of social media and constructing a database.

Patent Document 4 and Non-Patent Documents 1 to 5 disclose a technique for estimating, based on a friendship, an activity range of a user having an account on social media.

Patent Documents 5 to 7 and Non-Patent Documents 6 and 7 disclose a technique for determining an account of social media possessed by the same person.

A technique disclosed in Patent Document 8 generates, based on account information of a target user on social media, a first location distribution of the target user. Further, the technique generates, based on account information of a friend relating to the target user on social media, a second location distribution of the friend. Then, the technique estimates, based on the generated first location distribution and second location distribution, an activity location of the target user.

DISCLOSURE OF THE INVENTION

Provision and the like of community information using contribution information of social media have been attempted. However, contribution information of social media is a mixture of wheat and chaff Therefore, a technique for extracting useful information from contribution information of social media is required.

For example, by using the technique in Patent Document 1, contribution information having high credibility can be extracted. However, in a case of evaluation for credibility using only a daily life sphere indicating an activity area of a user, accuracy of the evaluation may be insufficient. Patent Documents 2 to 8 and Non-Patent Documents 1 to 7 do not relate to a technique for extracting useful information from contribution information of social media.

In view of the above-described problem, one example of an object of the present invention is to provide a processing apparatus, a processing method, and a program that solve an issue in that useful information is extracted, with high accuracy, from contribution information of social media.

According to one aspect of the present invention, provided is a processing apparatus including:
an acquisition unit that acquires contribution information relating to a target area;
a computation unit that computes a degree of reliability of the contribution information, based on at least two of an activity area of a contributor of the contribution information, a degree of reliability of an estimation result of the activity area, a degree of disclosure of a profile of the contributor, an attribute of the contributor, an attribute of the activity area for the contributor, and a category of a content of the contribution information; and an output unit that outputs the contribution information in which a degree of reliability of the contribution information is higher than a threshold value.

According to one aspect of the present invention, provided is a processing method including,
by one or more computers:
acquiring contribution information relating to a target area;
computing a degree of reliability of the contribution information, based on at least two of an activity area of a contributor of the contribution information, a degree of reliability of an estimation result of the activity area, a degree of disclosure of a profile of the contributor, an attribute of the contributor, an attribute of the activity area for the contributor, and a category of a content of the contribution information; and outputting the contribution information in which a degree of reliability of the contribution information is higher than a threshold value.

According to one aspect of the present invention, provided is a program causing a computer to function as:

an acquisition unit that acquires contribution information relating to a target area;

a computation unit that computes a degree of reliability of the contribution information, based on at least two of an activity area of a contributor of the contribution information, a degree of reliability of an estimation result of the activity area, a degree of disclosure of a profile of the contributor, an attribute of the contributor, an attribute of the activity area for the contributor, and a category of a content of the contribution information; and an output unit that outputs the contribution information in which a degree of reliability of the contribution information is higher than a threshold value.

According to one aspect of the present invention, a processing apparatus, a processing method, and a program that solve an issue in that useful information is extracted, with high accuracy, from contribution information of social media are achieved.

BRIEF DESCRIPTION OF THE DRAWINGS

The above-described object, other objects, features, and advantages will become more apparent from a preferred example embodiment described below and the following accompanying drawings.

FIG. 5 is a diagram schematically illustrating one example of information processed by the processing apparatus.

DESCRIPTION OF EMBODIMENTS

Example embodiments of the present invention will be described below by using drawings. Note that, in every drawing, a similar component is given a similar sign, and description thereof is omitted as appropriate.

First Example Embodiment

Figure 1:
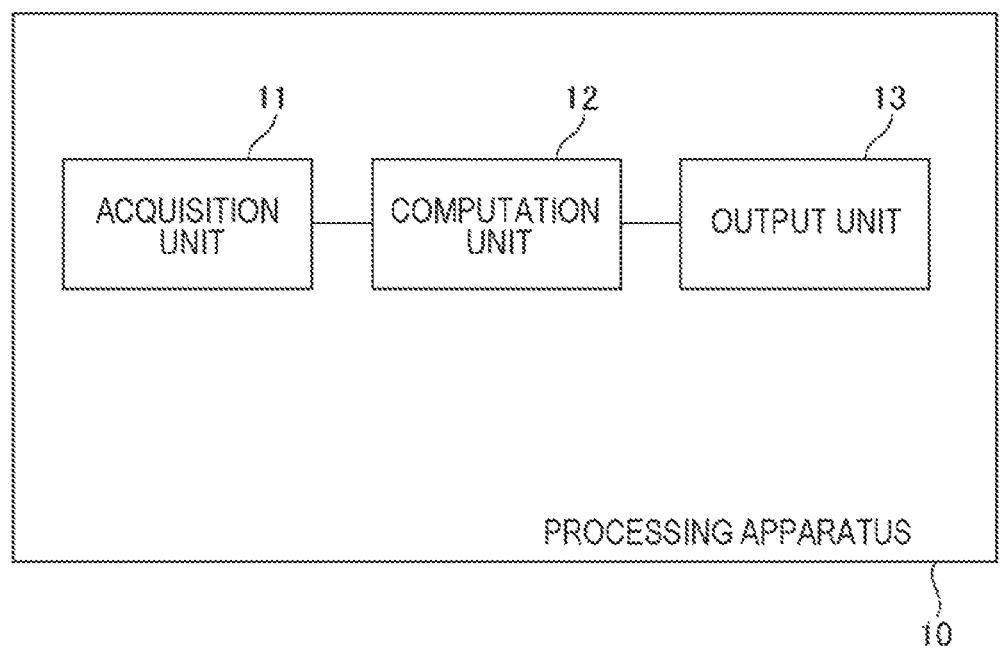
FIG. 1 is a diagram illustrating one example of a function block diagram of a processing apparatus.

FIG. 1 is a function block diagram illustrating an outline of a processing apparatus 10 according to a first example embodiment. The processing apparatus 10 includes an acquisition unit 11, a computation unit 12, and an output unit 13.

The acquisition unit 11 acquires contribution information relating to a target area. The computation unit 12 computes a degree of reliability of the contribution information, based on at least two of an activity area of a contributor of the contribution information, a degree of reliability of an estimation result of the activity area, a degree of disclosure of a profile of the contributor, an attribute of the contributor, an attribute of the activity area for the contributor, and a category of a content of the contribution information. The output unit 13 outputs the contribution information in which a degree of reliability of the contribution information is higher than a threshold value.

In this manner, according to the processing apparatus 10 of the present example embodiment that computes, by using at least two pieces of characteristic information, a degree of reliability of contribution information, an issue in that useful information is extracted, with high accuracy, from contribution information of social media is solved.

Second Example Embodiment

Outline

A processing apparatus 10 according to the present example embodiment is achieved by embodying the processing apparatus 10 according to the first example embodiment. By using FIG. 2, an outline of processing executed by the processing apparatus 10 is described. Note that, details of each piece of processing are described later.

Figure 2:
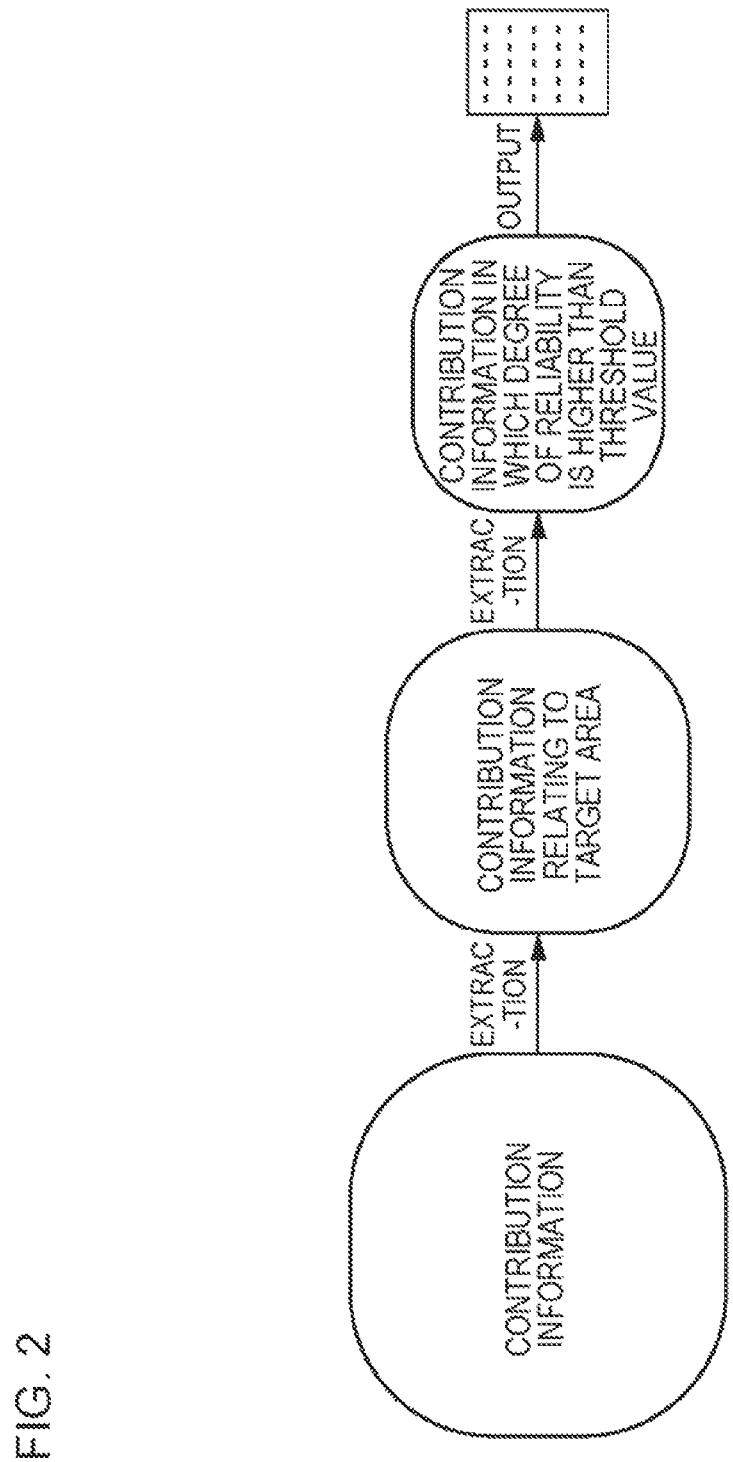
FIG. 2 is a diagram illustrating an outline of one example of processing executed by the processing apparatus.

As illustrated in FIG. 2, the processing apparatus 10 extracts contribution information relating to a target area from contribution information of social media. The target area is an area where predetermined processing (e.g., provision and the like of community information) using contribution information is executed. Then, the processing apparatus 10 extracts, from the extracted contribution information, contribution information in which a degree of reliability is higher than a threshold value, and outputs the extracted contribution information. The processing apparatus 10 computes, based on a characteristic method to be describe later, a degree of reliability of each piece of contribution information, and extracts contribution information in which a degree of reliability is higher than a threshold value.

According to the processing apparatus 10 of the present example embodiment as described above, an issue in that useful information is extracted, with high accuracy, from contribution information of social media is solved. Hereinafter, a configuration of the processing apparatus 10 according to the present example embodiment is described in detail.

Hardware Configuration

Next, one example of a hardware configuration of the processing apparatus 10 is described. Each function unit of the processing apparatus 10 is achieved based on any combination of hardware and software. It should be understood by those of ordinary skill in the art that there are various modified examples in the achievement method. The software includes a program previously stored from a shipment stage of an apparatus, a program downloaded from a storage medium such as a compact disc (CD), a server on the Internet, or the like, and the like.

Figure 3:
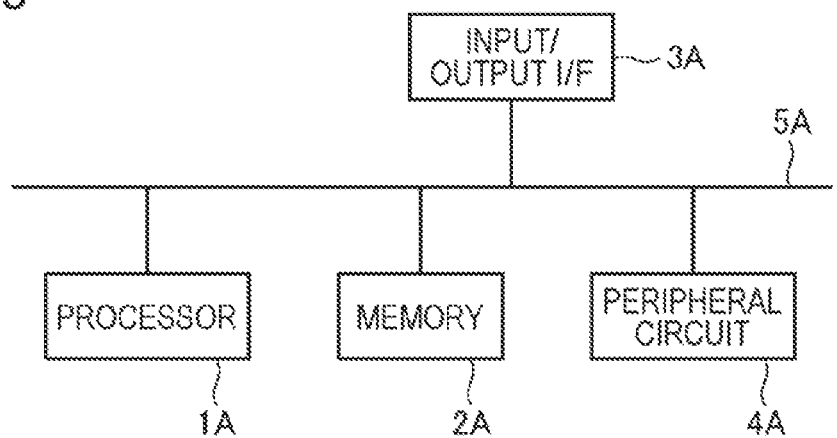
FIG. 3 is a diagram illustrating one example of a hardware configuration of the processing apparatus.

FIG. 3 is a block diagram illustrating a hardware configuration of the processing apparatus 10. As illustrated in FIG. 3, the processing apparatus 10 includes a processor 1A, a memory 2A, an input/output interface 3A, a peripheral circuit 4A, and a bus 5A. The peripheral circuit 4A includes various modules. The processing apparatus 10 may not necessarily include the peripheral circuit 4A. Note that, the processing apparatus 10 may be configured by a plurality of apparatuses separated physically and/or logically. In this case, each of the plurality of apparatuses can include the hardware configuration described above.

The bus 5A is a data transmission path in which the processor 1A, the memory 2A, the peripheral circuit 4A, and the input/output interface 3A mutually transmit/receive data. The processor 1A is an arithmetic processing apparatus, for example, such as a central processing unit (CPU) and a graphics processing unit (GPU). The memory 2A is a memory, for example, such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. Further, the input/output interface 3A can include an interface for connection to a communication network such as the Internet. The input apparatus is, for example, a keyboard, a mouse, a microphone, a physical button, a touch panel, and the like. The output apparatus is, for example, a display, a speaker, a printer, a mailer, and the like. The processor 1A can issue an instruction to each module, and perform an arithmetic operation, based on arithmetic operation results of the modules.

Function Configuration

Next, a function configuration of the processing apparatus 10 according to the present example embodiment is described in detail. FIG. 1 illustrates one example of a function block diagram of the processing apparatus 10. As illustrated, the processing apparatus 10 includes an acquisition unit 11, a computation unit 12, and an output unit 13.

The acquisition unit 11 acquires contribution information relating to a target area.

The "target area" is an area where predetermined processing using contribution information is executed. The predetermined processing is processing of providing, for a customer, contribution information itself, information generated by using contribution information, or the like as community information relating to the area, and the like. An operator of the processing apparatus 10 executes input for specifying a target area. The acquisition unit 11 determines, based on the input, a target area. The target area may be specified based on a place name. The target area is specified, for example, based on a country name, a prefectural government name, a municipal government name, a state name, a name of a shopping district, or the like (e.g., "Japan", "Kanagawa Prefecture", "Kawasaki City", and the like). Note that, the target area may be specified based on another method such as surrounding of a partial area on a map.

The "contribution information" is information posted on social media and then disclosed. The contribution information is constituted of a message, a still image, a moving image, a voice, and the like.

The "contribution information relating to a target area" includes at least one of contribution information in which a contribution location falls within a target area, and contribution information in which a content of contribution information relates to a target area or a target (e.g., a facility, a store, a natural object, or the like) present in the target area.

The "social media" are an online service in which a plurality of accounts (users) transmit (disclose) information among a plurality of accounts (users) and perform communication on the Internet (online). The social media can include a social networking service (SNS), a messaging service such as chat, a blog, an electronic bulletin board (forum site), a moving image sharing site, an information sharing site, a social game, a social bookmark, and the like.

A system of social media includes a server on a cloud and a user terminal. The server may be a social medial server, or may be a web server. The user terminal logs in, based on an account of a user, via an application programming interface (API) provided by the server. Then, the user terminal performs input or browsing a contribution, registration of a linkage between accounts such as a friendship and a follow relationship, and the like. The acquisition unit 11 can acquire contribution information from a server of a system in such social media.

Herein, processing executed by the acquisition unit 11 is described. The acquisition unit 11 collects contribution information disclosed on the Internet, and stores the collected contribution information in a storage apparatus. The storage apparatus may be included in the processing apparatus 10, or may be included in an external apparatus configured communicably with the processing apparatus 10.

Then, the acquisition unit 11 extracts, from the contribution information stored in the storage apparatus, contribution information relating to a target area.

When contribution information is provided with contribution location information (e.g., latitude/longitude information and the like) indicating a contribution location, the acquisition unit 11 extracts contribution information in which a location indicated by the contribution location information falls within a target area, as contribution information relating to the target area.

Further, the acquisition unit 11 can analyze contribution information, and extract contribution information relating to a target area. The acquisition unit 11 may extract, as the contribution information relating to a target area, for example, contribution information in which a predetermined keyword relating to the target area is included in a message or a hashtag of the contribution information. The predetermined keyword relating to a target area is a name, a nickname, a nominal designation, or an abbreviation of the target area, a name, a nickname, or a nominal designation of a facility in the target area, or the like. The predetermined keyword relating to a target area is previously registered in the processing apparatus 10.

Further, the acquisition unit 11 may analyze an image (a still image or a moving image) of contribution information, and determine an image capture location. Then, the acquisition unit 11 may extract, as the contribution information relating to a target area, contribution information in which an image capture location of the image falls within the target area. The image capture location may be determined based on metadata provided for an image, or may be determined by detecting, based on an image analysis, a landmark unique to each location captured in the image.

Further, the acquisition unit 11 may extract, as the contribution information relating to a target area, contribution information in which a predetermined keyword relating to the target area is included in a voice of the contribution information. The predetermined keyword relating to a target area is as described above. Details of processing of determining whether a predetermined keyword is included in a voice are not specifically limited. For example, voice data are converted into text data by using a voice recognition technique, and thereafter, a predetermined keyword may be retrieved in the text data.

The computation unit 12 computes a degree of reliability of each piece of contribution information acquired by the acquisition unit 11. The computation unit 12 computes a degree of reliability of contribution information, based on at least two of an activity area of a contributor of the contribution information, a degree of reliability of an estimation result of the activity area, a degree of disclosure of a profile of the contributor, an attribute of the contributor, an attribute of the activity area for the contributor, and a category of a content of the contribution information.

The computation unit 12 can compute, for example, in a computation example 4 or 5 described below, a degree of reliability of each piece of contribution information acquired by the acquisition unit 11. Further, the computation unit 12 can compute, by combining two or more of computation examples 1 to 5 described below, a degree of reliability of each piece of contribution information acquired by the acquisition unit 11.

Note that, the computation unit 12 may compute, based on the computation example 1 and at least one of the computation examples 2 to 5, a degree of reliability of contribution information. Although described below, in the computation example 1, a degree of reliability is computed based on a relationship between an activity area of a contributor and a target area. When at least such a computation example 1 is used, the computation unit 12 can compute a degree of reliability, with respect to the "contribution information relating to a target area", of each piece of contribution information acquired by the acquisition unit 11.

Figure 4:
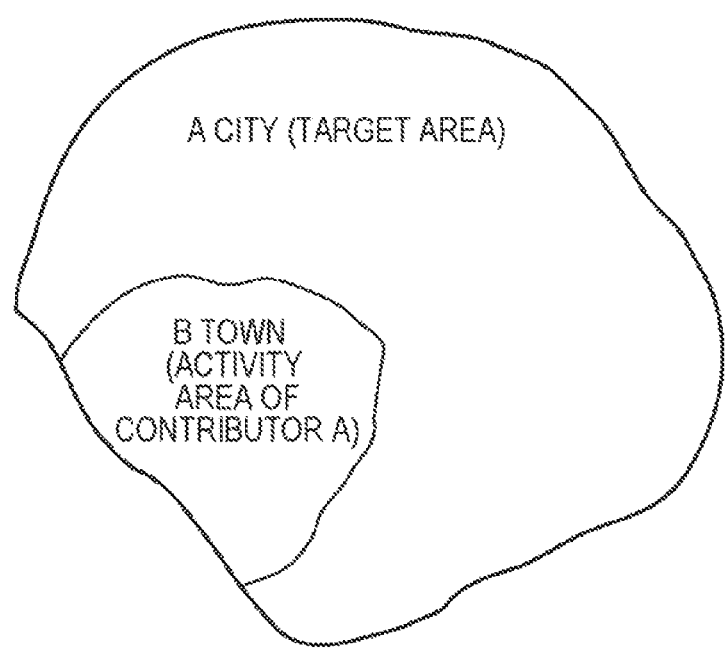
FIG. 4 is a diagram illustrating one example of processing executed by the processing apparatus.

Computation Example 1: Computation of Degree of Reliability of Contribution Information Based on Activity Area of Contributor The computation unit 12 determines an activity area in a target area with respect to each contributor of contribution information acquired by the acquisition unit 11. In a case of an example in FIG. 4, the target area is A city. Then, B town in the target area is determined as an activity area of a contributor A. Note that, although not illustrated, a contributor in which A city as a whole is an activity area may be present. Further, although not illustrated, a contributor in which there is no activity area in A city may be also present.

Then, the computation unit 12 computes a higher degree of reliability for contribution information of a contributor in which a degree of matching between a target area and an activity area is larger. The degree of matching is, for example, a "size of an activity area in a target area", i.e., a size of an area where these areas are overlapped with each other. Further, the degree of matching may be a "ratio of a size occupied by an activity area in a target area". Further, the degree of matching may be a "ratio of a size occupied by a target area in an activity area". A specific computation method of a degree of reliability can be optionally designed in a range where the condition is satisfied.

Note that, the "activity area" is an area where a contributor performs activity in a real world, and is indicated as a municipal government, an area wider than the municipal government, or an area narrower than the municipal government.

The computation unit 12 can compute an activity area, for example, based on open information disclosed on social media.

The "open information" can include any pieces of information disclosed in association with a user of each account on social media. The open information includes, for example, at least one of a profile of a user of each account, contribution information posted by a user of each account, relation information indicating a relation with a user of another account on social media, a profile of a user of another account having a predetermined relation with a user of each account on social media, and contribution information posted by a user of the another account.

The "relation information" is information indicating a linkage with a user of another account on social media. The relation information may indicate, for example, at least one of a user of another account having a mutual follow relation with a user of each account, a user of another account followed by a user of each account, a user of another account following a user of each account, a user of another account in which there is an exchange history of messages with a user of each account, and a user of another account who has been present at same timing and in the same location as a user of each account.

The matter that "there is an exchange history of messages" may be a state where at least one user has transmitted, to the other user, text data, a pictograph, a photograph, a moving image, a voice, an icon, and the like, or has performed an action by depressing a like button. Further, the matter that "there is an exchange history of messages" may be a state where both users have transmitted, to each other, text data, a pictograph, a photograph, a moving image, a voice, an icon, and the like, or have performed an action by depressing a like button.

The computation unit 12 may estimate an activity area of each contributor, for example, based on a profile of each contributor disclosed on social media. In a case of this example, the computation unit 12 may estimate, as an activity area of each contributor, a residence district disclosed in a profile.

Further, the computation unit 12 may determine, as an activity area of a contributor followed at a predetermined number or more of times in an account relating to a certain area, the area. The "account relating to a certain area" is, for example, an account in which, in a profile, the area is a residence district.

Further, the computation unit 12 may determine, as an activity area of a contributor who acquires a predetermined number or more of "likes" from an account relating to a certain area, the area.

Further, the computation unit 12 may determines, as an activity area of a contributor retweeted at a predetermined number or more of times from an account relating to a certain area, the area.

Further, the computation unit 12 may determine, as an activity area of a contributor following a predetermined number or more of a store, a company, an organization, an association, and the like present in a certain area, the area.

Further, the computation unit 12 may determine, as an activity area of a contributor followed at a predetermined number or more of times from a store, a company, an organization, an association, and the like present in a certain area, the area.

Further, the computation unit 12 may determine, as an activity area of a contributor who acquires a predetermined number or more of "likes" from a store, a company, an organization, an association, and the like present in a certain area, the area.

Further, the computation unit 12 may determine, as an activity area of a contributor retweeted at a predetermined number or more of times from a store, a company, an organization, an association, and the like present in a certain area, the area.

Further, the computation unit 12 may estimate an activity area, based on location information of a contribution of a person him/herself and the number of times of contributions. For example, the computation unit 12 estimates, as an activity area of the person him/herself, an area where the number of times of contributions is equal to or more than a predetermined number of times.

Further, the computation unit 12 may estimate an activity area of a contributor, by using another technique, for example, such as the techniques disclosed in Patent Documents 4 and 8 and Non-Patent Documents 1 to 5.

Note that, the computation unit 12 may determine a plurality of accounts possessed by the same user (a user of social media). Then, in estimation of an activity area of a user of a certain account, not only open information disclosed in association with the account but also open information disclosed in association with another account of the user are further usable. When more pieces of open information are used, estimation accuracy of an activity area is improved. A method of determining a plurality of accounts possessed by the same user is not specifically limited, and any techniques, for example, such as the techniques disclosed in Patent Documents 5 to 7 and Non-Patent Documents 6 and 7 are employable.

Further, when a plurality of activity areas of a certain contributor are present, the computation unit 12 can determine, based on some or all of the activity areas, whether an activity area is present in a target area.

Computation Example 2: Computation of Degree of Reliability of Contribution Information Based on Degree of Reliability of Estimation Result of Activity Area The computation unit 12 computes, in a contributor having an activity area in a target area, a higher degree of reliability for contribution information of a contributor in which a degree of reliability of an estimation result having the area as an activity area is higher. In the case of the example in FIG. 4, the contributor A has an activity area (B town) in A city being a target area. A degree of reliability of contribution information of the contributor A is higher as a degree of reliability of an estimation result in which B town is an activity area of the contributor A is higher. A specific computation method of a degree of reliability of contribution information can be optionally designed in a range where the condition is satisfied.

A method of computing a degree of reliability of an estimation result of an activity area for each contributor is not specifically limited. For example, the technique disclosed in Patent Document 8 is employable. A "score of an activity area" disclosed in Patent Document 8 is a degree of reliability of an estimation result of an activity area.

Computation Example 3: Computation of Degree of Reliability of Contribution Information Based on Degree of Disclosure of Profile of Contributor In a case of the example, the acquisition unit 11 further acquires a profile of each contributor disclosed on social media. Items included in the profile are different in each social media, and include, for example, a user name, a nickname, gender, a birth date, nationality, age (or an age boundary), a hometown, a current residence district, an affiliation (a company name or a school name), an affiliated school, and the like.

Note that, on social media, each user can select disclosure/non-disclosure of these pieces of profile information. Disclosure/non-disclosure may be selected, for example, with respect to each item.

Then, the computation unit 12 computes a higher degree of reliability for contribution information of a contributor in which more profiles are disclosed. The computation unit 12 may compute a higher degree of reliability, for example, for contribution information of a contributor in which the number of disclosed items is larger.

Further, a weighing score may be previously set for each item. For an item having a higher degree of importance, a higher weighing score is provided. Then, the computation unit 12 may add, for each contributor, weighing scores of disclosed items, and thereby, compute a disclosure-degree score. In this case, the computation unit 12 computes a higher degree of reliability for contribution information of a contributor having a higher disclosure-degree score.

A specific computation method of a degree of reliability can be optionally designed in a range where the above-described condition is satisfied.

Computation Example 4: Computation of Degree of Reliability of Contribution Information Based on Attribute of Contributor and Category of Content of Contribution Information The computation unit 12 computes further highly a degree of reliability of contribution information in which an attribute of a contributor and a category of a content of the contribution information satisfy a predetermined relation than a degree of reliability of contribution information which does not satisfy the predetermined relation. A specific computation method of a degree of reliability can be optionally designed in a range where the condition is satisfied.

A combination between an "attribute of a contributor" and a "category of a content of contribution information" in which a higher degree of reliability is computed is previously registered in the processing apparatus 10. The contribution information forming the registered combination is contribution information which satisfies the above-described predetermined relation.

For example, a combination between an attribute "mother" or "father" of a contributor and a category "kindergarten", "nursery school", "school", "cram school", "child-raising", "park", "enrichment lesson", "hospital, or the like of a content of contribution information is registered in the processing apparatus 10.

Further, for example, a combination between an attribute "student" of a contributor and a category "school", "cram school", or the like of a content of contribution information is registered in the processing apparatus 10.

An attribute of a contributor can be estimated based on a profile of each contributor disclosed on social media and contribution information of each contributor. When, for example, in a profile, "student" is registered, the computation unit 12 may estimate an attribute of the contributor as "student".

As another example, when an age disclosed in a profile ranges from ages 20 to 60, gender is female, and the same child is captured highly frequently (e.g., a predetermined number of times or more, or a predetermined number of times or more in a predetermined period) in an image of contribution information, the computation unit 12 may estimate an attribute of the contributor as "mother". Similarly, when an age disclosed in a profile ranges from ages 20 to 60, gender is male, and the same child is captured highly frequently (e.g., a predetermined number of times or more, or a predetermined number of times or more in a predetermined period) in an image of contribution information, the computation unit 12 may estimate an attribute of the contributor as "father".

As another example, when an age disclosed in a profile ranges from ages 20 to 60, gender is female, and a predetermined keyword relating to child-raising is included highly frequently (e.g., a predetermined number of times or more, or a predetermined number of times or more in a predetermined period) in a message of contribution information, the computation unit 12 may estimate an attribute of the contributor as "mother". Similarly, when an age disclosed in a profile ranges from ages 20 to 60, gender is male, and a predetermined keyword relating to child-raising is included highly frequently (e.g., a predetermined number of times or more, or a predetermined number of times or more in a predetermined period) in a message of contribution information, the computation unit 12 may estimate an attribute of the contributor as "father". The predetermined keyword relating to child-raising is "kindergarten", "nursery school", "school", "cram school", "child-raising", "park", "enrichment lesson", "hospital, or the like, and is previously registered in the processing apparatus 10.

A category of a content of contribution information can be estimated based on each piece of contribution information. For example, with respect to each category, a keyword relating to each category is previously registered in the processing apparatus 10. Then, the computation unit 12 can estimate, as a category of a content of each piece of contribution information, a category including the related keyword.

Computation Example 5: Computation of Degree of Reliability of Contribution Information Based on Attribute of Activity Area for Contributor and Category of Content of Contribution Information The computation unit 12 computes further highly a degree of reliability of contribution information in which an attribute for a contributor of an activity area in a target area and a category of a content of the contribution information satisfy a predetermined relation than a degree of reliability of contribution information which does not satisfy the predetermined relation. A specific computation method of a degree of reliability can be optionally designed in a range where the condition is satisfied.

Herein, the "attribute for a contributor of an activity area in a target area" is described. In the case of the example in FIG. 4, for the contributor A, B town is an activity area in a target area. Then, an attribute of B town for the contributor A is the "attribute for a contributor of an activity area in a target area" described above. The attribute of B town for the contributor A is, for example, a residence district, a work place, a school location, a non-work day frequently-occurring spot, and the like.

A combination between an "attribute for a contributor of an activity area in a target area" and a "category of a content of contribution information" in which a higher degree of reliability is computed is previously registered in the processing apparatus 10. The contribution information forming the registered combination is contribution information which satisfies the above-described predetermined relation.

For example, a combination between an attribute "residence district" for a contributor of an activity area in a target area and a category "kindergarten", "nursery school", "school", "cram school", "child-raising", "park", "enrichment lesson", "hospital, or the like of a content of contribution information is registered in the processing apparatus 10.

Further, for example, a combination between an attribute "work place" for a contributor of an activity area in a target area and a category "restaurant", "set menu restaurant", "cafe", "bar", "Japanese tavern", or the like is registered in the processing apparatus 10.

Further, for example, a combination between an attribute "school location" for a contributor of an activity area in a target area and a category "restaurant", "cafe", or the like is registered in the processing apparatus 10.

An attribute for a contributor of an activity area in a target area can be estimated based on a profile of each contributor disclosed on social media and contribution information of each contributor.

The computation unit 12 can estimate, as a school location or a work place, for example, an activity area where a frequency in which a contribution location is present in a time period ranging from 9 a.m. to 5 p.m. on a weekday (Monday to Friday) is higher than a frequency in which a contribution location is present on a non-work day (Saturday and Sunday) or in a night-time of a weekday. Then, when, for example, an age disclosed in a profile is teenage, the computation unit 12 can estimate the activity area as a "school location". On the other hand, when, for example, an age disclosed in a profile is equal to or more than a predetermined age (e.g., equal to or more than an age of 20), the computation unit 12 can estimate the activity area as a "work place".

A category of a content of contribution information can be estimated based on each piece of contribution information. For example, with respect to each category, a keyword relating to each category is previously registered in the processing apparatus 10. Then, the computation unit 12 can estimate, as a category of a content of each piece of contribution information, a category including the related keyword.

Referring back to FIG. 1, the output unit 13 outputs contribution information in which a degree of reliability of the contribution information is higher than a threshold value.

Based on processing by the acquisition unit 11 and the computation unit 12, data as illustrated in FIG. 5 are acquired. The data illustrated in FIG. 5 are data generated by specifying "Kawasaki City, Kanagawa Prefecture" as a target area. The data illustrated in FIG. 5 are registered in association with a contribution information identifier (ID) for identifying, with each other, pieces of contribution information relating to a target area acquired by the acquisition unit 11, contribution information, location information indicating a contribution location, and a degree of reliability of contribution information computed by the computation unit 12. The output unit 13 can extract, based on the date, for example, contribution information in which a degree of contribution information is higher than a threshold value, and output, by using a characteristic method, the extracted contribution information.

The output unit 13 can output some pieces or all pieces of the extracted contribution information by arranging the pieces of the contribution information in order of a degree of reliability (see FIG. 5).

Further, the output unit 13 can display, as a list, some pieces or all pieces of the extracted contribution information, and also output, with emphasized display, contribution information in which a degree of contribution information is higher than a reference value. Note that, the reference value is higher than a threshold value.

Figure 6:
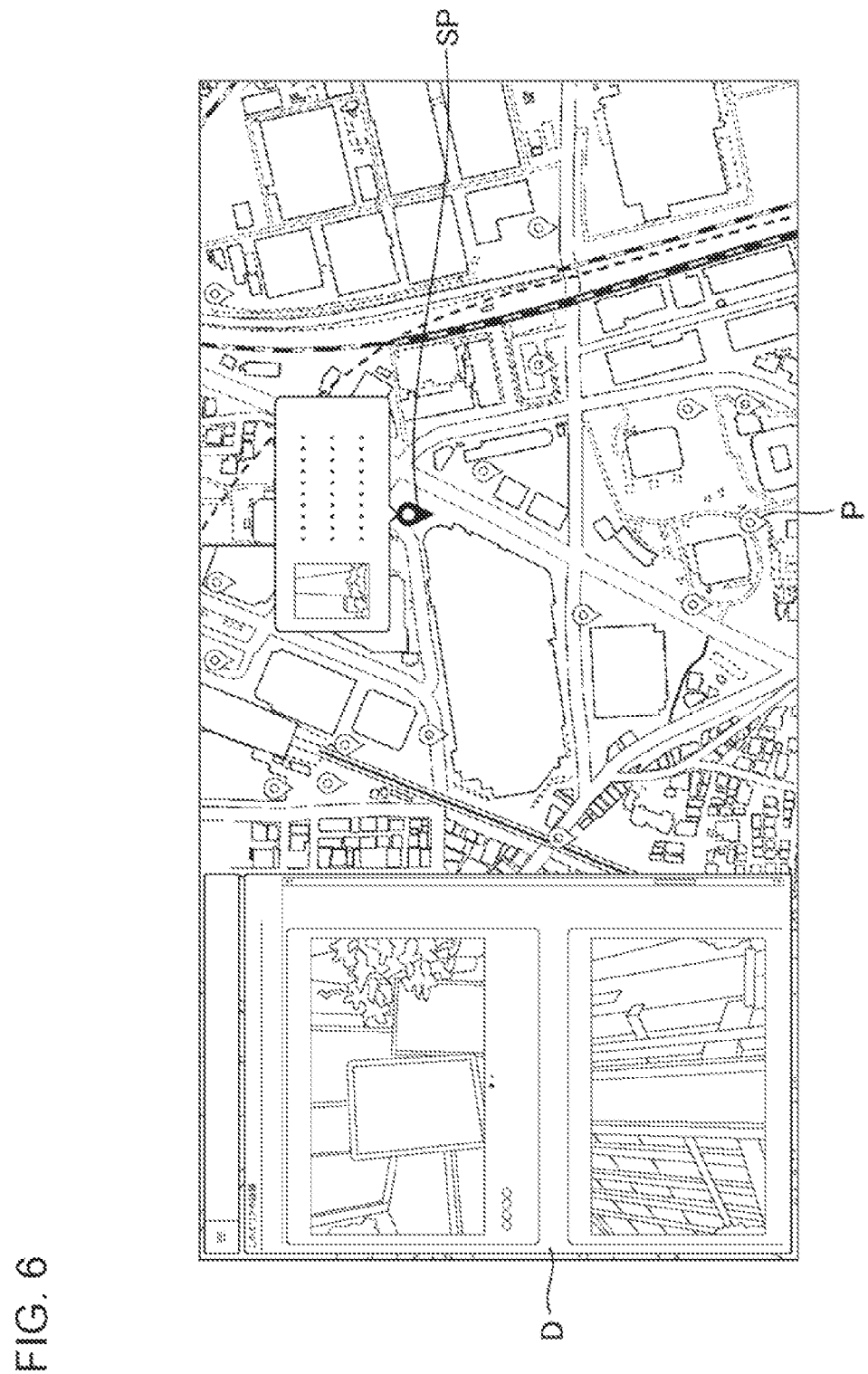
FIG. 6 is a diagram schematically illustrating one example of information output by the processing apparatus.

Further, the output unit 13 can output the extracted contribution information, for example, by using a method as illustrated in FIG. 6.

In the example illustrated in FIG. 6, the output unit 13 outputs, based on mapping, the extracted contribution information on a map. Specifically, a contribution location of the extracted contribution information is provided with a predetermined mark P. Then, when a predetermined operation (e.g., a touch operation or a click operation) is performed for one mark SP, contribution information posted in the location is displayed.

Further, in the example illustrated in FIG. 6, the output unit 13 displays, as a list, in an area D, pieces of contribution information in which a contribution location (a location of the mark P) in the extracted contribution information is screen-displayed in an area. The area screen-displayed is changed according to a screen enlargement/reduction operation, an operation for shifting a location to be screen-displayed, or the like based on a user.

In the area D, a plurality of pieces of contribution information may be arranged and displayed as a list in contribution order (a descending order by time or an ascending order by time). Further, in the area D, a plurality of pieces of contribution information may be arranged and displayed as a list in order of a degree of reliability (a descending order or an ascending order) of contribution information.

Further, in the area D, contribution information in which a degree of reliability of the contribution information is higher than a reference value may be emphatically displayed. Further, the mark P being present in a contribution location of contribution information in which a degree of reliability of the contribution information is higher than a reference value may be emphatically displayed. Note that, the reference value is higher than a threshold value. A method of emphasized display is not specifically limited, and blinking, surrounding with a frame, display with a predetermined color, and the like are cited without limitation thereto.

The output unit 13 can display (output) information as described above, for example, on a display included in the processing apparatus 10. Further, the processing apparatus 10 may be a server. Then, the output unit 13 may transmit (output) information as described above to a client terminal.

Figure 7:
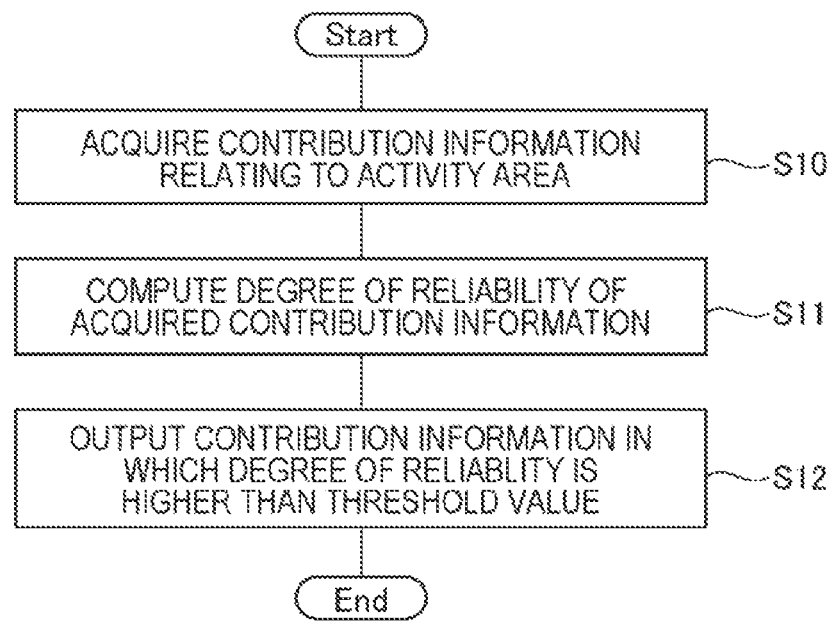
FIG. 7 is a flowchart illustrating one example of a flow of processing of the processing apparatus.

Next, by using the flowchart in FIG. 7, one example of a flow of processing of the processing apparatus 10 is described.

The processing apparatus 10 acquires contribution information relating to a target area (S10), and then computes a degree of reliability of the contribution information, based on at least two of an activity area of a contributor of the contribution information, a degree of reliability of an estimation result of the activity area, a degree of disclosure of a profile of the contributor, an attribute of the contributor, an attribute of the activity area for the contributor, and a category of a content of the contribution information (S11). Then, the processing apparatus 10 outputs contribution information in which a degree of reliability of the contribution information is higher than a threshold value (S12).

Advantageous Effect

According to the processing apparatus 10 of the present example embodiment, an advantageous effect similar to that of the first example embodiment is achieved.

Further, according to the processing apparatus 10 of the present example embodiment, a degree of reliability of contribution information can be computed based on at least two of an activity area of a contributor of the contribution information, a degree of reliability of an estimation result of the activity area, a degree of disclosure of a profile of the contributor, an attribute of the contributor, an attribute of the activity area for the contributor, and a category of a content of the contribution information. Two pieces or more of such characteristic information are combined, and thereby, a degree of reliability of contribution information is computed, and therefore the processing apparatus 10 can compute, with high accuracy, a degree of reliability of contribution information.

Further, the processing apparatus 10 can arrange and output contribution information in order of a degree of reliability, and also emphatically display contribution information in which a degree of reliability is higher than a reference value. According to such a processing apparatus 10, information having a higher degree of reliability easily reaches a user.

Modified Example

As described above, an acquisition unit 11 acquires contribution information relating to a target area. As a modified example, the acquisition unit 11 may acquire some pieces of contribution information relating to a target area. The acquisition unit 11 can narrow down information to be acquired, based on predetermined information. The predetermined information includes at least one of a posting date and time and an attribute of a contributor.

The acquisition unit 11 may acquire, for example, contribution information relating to a target area and being contribution information in which a posting date and time falls within a predetermined period (e.g., in the last year). Further, the acquisition unit 11 may acquire contribution information relating to a target area and being contribution information in which an attribute of a contributor satisfies a predetermined condition (e.g., female, male, a teenager, twenties or older, and the like). The predetermined period and the predetermined condition can be set by an operator of the processing apparatus 10.

According to the modified example, from among enormous pieces of contribution information, desired pieces of contribution information are acquired, and thereby, from among the desired pieces of contribution information, contribution information having a high degree of reliability can be extracted.

While example embodiments of the present invention have been described with reference to the drawings, these example embodiments are exemplification of the present invention, and various configurations other than the above-described configurations are employable. The configurations according to the above-described example embodiments may be combined with each other, or some configurations may be replaced with other configurations. Further, the configurations of the above-described example embodiments may be added with various modifications without departing from the spirit. Further, configurations and processing disclosed according to the above-described example embodiments and modified example may be combined with each other.

Further, in the flowchart used in the above-described description, a plurality of steps (pieces of processing) are described in order, but an execution order of steps to be executed according to each example embodiment is not limited to the described order. According to each example embodiment, an order of illustrated steps can be modified within an extent that there is no harm in context. Further, the above-described example embodiments can be combined within an extent that there is no conflict in content.

The whole or part of the example embodiments disclosed above can be described as, but not limited to, the following supplementary notes.

1. A processing apparatus including:
  an acquisition unit that acquires contribution information relating to a target area;
  a computation unit that computes a degree of reliability of the contribution information, based on at least two of an activity area of a contributor of the contribution information, a degree of reliability of an estimation result of the activity area, a degree of disclosure of a profile of the contributor, an attribute of the contributor, an attribute of the activity area for the contributor, and a category of a content of the contribution information; and
  an output unit that outputs the contribution information in which a degree of reliability of the contribution information is higher than a threshold value.

2. The processing apparatus according to supplementary note 1, wherein
  the computation unit computes a higher degree of reliability for the contribution information of the contributor in which a degree of matching between the target area and the activity area is larger.

3. The processing apparatus according to supplementary note 1 or 2, wherein
  the computation unit computes a higher degree of reliability for the contribution information of the contributor in which a degree of reliability of an estimation result of the activity area in the target area is higher.

4. The processing apparatus according to any one of supplementary notes 1 to 3, wherein
  the computation unit computes a higher degree of reliability for the contribution information of the contributor in which more profiles are disclosed.

5. The processing apparatus according to any one of supplementary notes 1 to 4, wherein
  the computation unit computes further highly a degree of reliability of the contribution information in which an attribute of the contributor and a category of a content of the contribution information satisfy a predetermined relation than a degree of reliability of the contribution information which does not satisfy the predetermined relation.

6. The processing apparatus according to any one of supplementary notes 1 to 5, wherein
  the computation unit computes further highly a degree of reliability of the contribution information in which an attribute for the contributor of the activity area in the target area and a category of a content of the contribution information satisfy a predetermined relation than a degree of reliability of the contribution information which does not satisfy the predetermined relation.

7. The processing apparatus according to any one of supplementary notes 1 to 6, wherein
  the output unit outputs some pieces or all pieces of the contribution information in which a degree of reliability of the contribution information is higher than the threshold value, by arranging the pieces of the contribution information in order of a degree of reliability of the contribution information.

8. The processing apparatus according to any one of supplementary notes 1 to 6, wherein
  the output unit
    displays, as a list, some pieces or all pieces of the contribution information in which a degree of reliability of the contribution information is higher than the threshold value,
    emphatically displays the contribution information in which a degree of reliability of the contribution information is higher than a reference value, and
  the reference value is higher than the threshold value.

9. A processing method including,
  by one or more computers:
    acquiring contribution information relating to a target area;
    computing a degree of reliability of the contribution information, based on at least two of an activity area of a contributor of the contribution information, a degree of reliability of an estimation result of the activity area, a degree of disclosure of a profile of the contributor, an attribute of the contributor, an attribute of the activity area for the contributor, and a category of a content of the contribution information; and
    outputting the contribution information in which a degree of reliability of the contribution information is higher than a threshold value.

10. A program causing a computer to function as:
  an acquisition unit that acquires contribution information relating to a target area;
  a computation unit that computes a degree of reliability of the contribution information, based on at least two of an activity area of a contributor of the contribution information, a degree of reliability of an estimation result of the activity area, a degree of disclosure of a profile of the contributor, an attribute of the contributor, an attribute of the activity area for the contributor, and a category of a content of the contribution information; and
  an output unit that outputs the contribution information in which a degree of reliability of the contribution information is higher than a threshold value.

Processing apparatus
11 Acquisition unit
12 Computation unit
13 Output unit
1A Processor
2A Memory
3A Input/output I/F
4A Peripheral circuit
5A Bus.

The invention claimed is:
1. A processing apparatus comprising:
  at least one memory configured to store one or more instructions; and
  at least one processor configured to execute the one or more instructions to:
    acquire contribution information relating to a target area, which is an area where predetermined processing using the contribution information is executed;
    compute a reliability value of the contribution information, based on at least two categories comprising an activity area of a contributor of the contribution information, the reliability value of an estimation result of the activity area, an amount of disclosed information in a profile of the contributor, an attribute of the contributor, an attribute of the activity area for the contributor, and a category of a content of the contribution information; and
    output the contribution information in which the reliability value of the contribution information is higher than a threshold value,
wherein the processor is further configured to execute the one or more instructions to:

retrieve keywords in a first contribution information, each of the keywords being related to each of the at least two categories, determine a category of the first contribution information based on the retrieved keywords, determine an attribute of a first contributor of the first contribution information based on a profile of the first contributor, identify whether the determined category of the first contribution information and the determined attribute of the first contributor satisfies a predetermined relationship compute a higher reliability value for the first contribution information of the contributor in which a size or an occupancy rate of the activity area in the target area is larger, display, as a list, some pieces or all pieces of the first contribution information in which the reliability value of the first contribution information is higher than the threshold value, and display the first contribution information in which the reliability value of the first contribution information is higher than a reference value, wherein the reference value is higher than the threshold value.

2. The processing apparatus according to claim 1, wherein the processor is further configured to execute the one or more instructions to compute a higher reliability value for the first contribution information of the contributor in which a reliability value of an estimation result of the activity area in the target area is higher.

3. The processing apparatus according to claim 1, wherein the processor is further configured to execute the one or more instructions to compute a higher reliability value for the first contribution information of the contributor in which more profiles are disclosed.

4. The processing apparatus according to claim 1, wherein the processor is further configured to execute the one or more instructions to compute highly a higher reliability value of the first contribution information in which an attribute of the contributor and a category of a content of the first contribution information satisfy a predetermined relation than a reliability value of the first contribution information which does not satisfy the predetermined relation.

5. The processing apparatus according to claim 1, wherein the processor is further configured to execute the one or more instructions to compute a higher reliability value of the first contribution information in which an attribute for the contributor of the activity area in the target area and a category of a content of the first contribution information satisfy a predetermined relation than a reliability value of the first contribution information which does not satisfy the predetermined relation.

6. The processing apparatus according to claim 1, wherein the processor is further configured to execute the one or more instructions to output some pieces or all pieces of the first contribution information in which a reliability value of the first contribution information is higher than the threshold value, by arranging the pieces of the first contribution information in order of a reliability value of the first contribution information.

7. A processing method comprising, by one or more computers:

acquiring contribution information relating to a target area;

computing a reliability value of the contribution information, based on at least two categories comprising an activity area of a contributor of the contribution information, a reliability value of an estimation result of the activity area, an amount of disclosed information in a profile of the contributor, an attribute of the contributor, an attribute of the activity area for the contributor, and a category of a content of the contribution information; and outputting the contribution information in which the reliability value of the contribution information is higher than a threshold value, wherein the processing method further comprises:

retrieving keywords in a first contribution information, each of the keywords being related to each of the at least two categories, determining a category of the first contribution information based on the retrieved keywords, determining an attribute of a first contributor of the first contribution information based on a profile of the first contributor, identifying whether the determined category of the first contribution information and the determined attribute of the first contributor satisfies a predetermined relationship, computing the reliability value of the first contribution information based on a result of the identifying, computing a higher reliability value for the first contribution information of the contributor in which a size or an occupancy rate of the activity area in the target area is larger, displaying, as a list, some pieces or all pieces of the first contribution information in which the reliability value of the first contribution information is higher than the threshold value, and displaying the first contribution information in which the reliability value of the first contribution information is higher than a reference value, wherein the reference value is higher than the threshold value.

8. The processing method according to claim 7, wherein the one or more computers compute a higher reliability value for the first contribution information of the contributor in which a reliability value of an estimation result of the activity area in the target area is higher.

9. The processing method according to claim 7, wherein the one or more computers compute a higher reliability value for the first contribution information of the contributor in which more profiles are disclosed.

10. The processing method according to claim 7, wherein the one or more computers compute further highly a reliability value of the first contribution information in which an attribute of the contributor and a category of a content of the first contribution information satisfy a predetermined relation than a reliability value of the first contribution information which does not satisfy the predetermined relation.

11. The processing method according to claim 7, wherein the one or more computers compute further highly a reliability value of the first contribution information in which an attribute for the contributor of the activity area in the target area and a category of a content of the first contribution information satisfy a predetermined relation than a reliability value of the first contribution information which does not satisfy the predetermined relation.

12. A non-transitory storage medium storing a program causing a computer to:

acquire contribution information relating to a target area, which is an area where predetermined processing using the contribution information is executed;
compute a reliability value of the contribution information, based on at least two categories comprising an activity area of a contributor of the contribution information, a reliability value of an estimation result of the activity area, an amount of disclosed information in a profile of the contributor, an attribute of the activity area for the contributor, and a category of a content of the contribution information; and
output the contribution information in which a reliability value of the contribution information is higher than a threshold value,
wherein the non-transitory storage medium further causes the computer to:
retrieve keywords in a first contribution information, each of the keywords being related to each of the at least two categories,
determine a category of the first contribution information based on the retrieved keywords,
determine an attribute of a first contributor of the first contribution information based on a profile of the first contributor,
identify whether the determined category of the first contribution information and the determined attribute of the first contributor satisfies a predetermined relationship, and
compute the reliability value of the first contribution information based on a result of the identifying,
compute a higher reliability value for the first contribution information of the contributor in which a size or an occupancy rate of the activity area in the target area is larger,
display, as a list, some pieces or all pieces of the first contribution information in which the reliability value of the first contribution information is higher than the threshold value, and
display the first contribution information in which the reliability value of the first contribution information is higher than a reference value, wherein the reference value is higher than the threshold value.

13. The non-transitory storage medium according to claim 12, wherein
the program causing the computer to compute a higher reliability value for the first contribution information of the contributor in which a size or an occupancy rate of the activity area in the target area is larger.

14. The non-transitory storage medium according to claim 12, wherein
the program causing the computer to compute a higher reliability value for the first contribution information of the contributor in which a reliability value of an estimation result of the activity area in the target area is higher.

15. The non-transitory storage medium according to claim 12, wherein the program causing the computer to compute a higher reliability value for the first contribution information of the contributor in which more profiles are disclosed.

16. The non-transitory storage medium according to claim 12, wherein
the program causing the computer to compute further highly a reliability value of the first contribution information in which an attribute of the contributor and a category of a content of the first contribution information satisfy a predetermined relation than a reliability value of the first contribution information which does not satisfy the predetermined relation.

17. The non-transitory storage medium according to claim 12, wherein
the program causing the computer to compute further highly a reliability value of the first contribution information in which an attribute for the contributor of the activity area in the target area and a category of a content of the first contribution information satisfy a predetermined relation than a reliability value of the first contribution information which does not satisfy the predetermined relation.

* * * * *